United States Patent [19]

Angenent et al.

[11] Patent Number: 4,931,077
[45] Date of Patent: Jun. 5, 1990

[54] METHOD OF MANUFACTURING A PLANAR OPTICAL COMPONENT

[75] Inventors: Johannes H. Angenent, Paris, France; Maritza G. J. Heijman; Gijsbertus A. C. M. Spierings, both of Eindhoven, Netherlands

[73] Assignee: U.S. Philips Corp., New York, N.Y.

[21] Appl. No.: 210,058

[22] Filed: Jun. 22, 1988

[30] Foreign Application Priority Data

Jun. 25, 1987 [NL] Netherlands .................... 8701478

[51] Int. Cl.$^5$ .................... C03C 15/00; C03C 17/245
[52] U.S. Cl. ................................. 65/31; 65/18.2; 156/645; 156/656; 156/657; 156/661.1; 156/663
[58] Field of Search .................. 65/31, 18.2; 156/653, 156/661.1, 663, 659.1, 645, 656, 657, 650, 651; 350/96.12, 320

[56] References Cited

U.S. PATENT DOCUMENTS 4,632,728 12/1986 Kawakami ...................... 156/663

FOREIGN PATENT DOCUMENTS 56-135808 10/1981 Japan .
57-00604 1/1982 Japan ...................... 65/31

*Primary Examiner*—Kenneth M. Schor
*Attorney, Agent, or Firm*—William L. Botjer

[57] ABSTRACT

Grooves are etched in a glass substrate, using a metallic mask, after which the substrate is coated with a layer of glass having a refractive index which is higher than that of the substrate, the groove being filled completely. Excess glass is removed, the metallic mask being used as a stop layer and a protective layer being provided at the location of the filled grooves. Excess glass is removed at the location of the grooves by means of polishing so that a high accuracy as regards depth can be obtained.

9 Claims, 2 Drawing Sheets

METHOD OF MANUFACTURING A PLANAR OPTICAL COMPONENT

BACKGROUND OF THE INVENTION

The invention relates to a method of manufacturing a planar optical component, in which at least one groove is etched in a glass substrate, use being made of a metallic mask which is applied to the substrate, after which the substrate is covered with a layer of glass having a refractive index which is higher than that of the substrate, the groove being filled entirely, after which excess glass is removed.

A similar method is described in the published Japanese Patent Application JP 56-135808, in which quartz glass is used as a substrate and a titanium layer having a thickness of 1 $\mu$m is used as a mask. After grooves have been etched with a depth of 10 $\mu$m, the titanium layer is removed by means of plasma etching. Subsequently, a layer of glass having a high refractive index is applied by means of chemical deposition from the vapour phase, after which a heating step is carried out to fuse the glass particles into a glass layer having a thickness of 30 $\mu$m, which glass layer contains recesses of approximately 2 $\mu$m at the surface over the grooves. Then, the excess glass is removed from the entire surface, at least up to the original surface of the substrate, by means of plasma etching. Finally, a protective layer of glass is applied having a refractive index which is equal to that of the substrate, for example, by means of chemical deposition from the vapour phase.

The known method enables patterns to be manufactured with a high lateral accuracy, for example with lines having a width from 1 to 5 $\mu$m, but a high accuracy as regards depth cannnot be attained.

SUMMARY OF THE INVENTION

It is an object of the invention to provide a method of manufacturing planar optical components, enabling optical waveguides to be manufactured with a high accuracy as regards both width and depth.

This object is achieved by a method as described in the opening paragraph, which method according to the invention is characterized in that the metallic mask is not removed before providing the glass having a high refractive index, the metallic mask serving as a stop layer during the removal of excess glass by etching, the glass provided being protected against etching at the location of the groove by a protective layer which has been applied according to a pattern, and the excess glass at the location of the filled groove being removed by polishing.

Preferably, the metallic mask is partly removed after the grooves have been etched, the substrate being cleared along the edges of the grooves. Preferably, the patterned protective layer is also removed prior to polishing.

In a paricularly suitable embodiment of the mothod according to the invention, a molybdenum layer is used as a metallic mask.

The desired accuracy of the pattern is attained in the manufacture of the metallic mask, for example, by means of a photoresist. Less accuracy is required in clearing the edges of the grooves and applying the patterned protective layer. Also the positioning of the various patterns relative to each other can be carried out without any problem in the method according to the invention.

The desired accuracy as regards depth is attained in that the metallic mask serves as a stop layer so that the removal of excess glass stops at the original surface of the substrate. At this stage, there remains a quantity of excess glass over the grooves. Since the surface of the substrate is largely flat, the excess material can be removed by polishing, the effectiveness of the polishing operation decreasing strongly at the moment that the surface of the glass in the grooves is flush with the surface of the substrate; at which instant the polishing operation is terminated. Such a degree of accuracy cannot be attained by removing all excess glass by polishing, as is described in the published Japanese Patent Application JP 53-70839, because there is no clear transition at the instant that the substrate is reached. Moreover, the flatness of the optical component would be endangered.

The glass having the high refractive index can be formed according to the invention by high-frequency sputtering of a silicon oxide target plate in an argon atmosphere at a pressure of at least 1 Pa, the substrate being at a positive electric potential. Another suitable method which is known per se is chemical desposition from the vapour phase under the influence of a plasma.

Quartz glass is a very suitable substrate material. The glass having the high refractive index can then be formed by means of chemical deposition from the vapour phase, a doping of nitrogen or germanium dioxide being applied. The glass having the high refractive index can alternatively be obtained by sputtering using a target plate of silicon dioxide which is doped with germanium dioxide.

In another suitable embodiment of the method according to the invention, the substrate consists of fluorine-doped quartz glass and the glass having the high refractive index consists of silicon dioxide which is provided by sputtering. Fluorine-doped quartz glass has a relatively low refractive index so that it becomes possible to a limited extent to adapt the sputtering conditions in order to obtain optimum light conductor properties, for example as regards attenuation.

BRIEF DESCRIPTION OF THE DRAWING

The invention will now explained in more detail by means of examples and a drawing, in which.

DETAILED DESCRIPTION OF THE PREFERRED EMBODIMENT

EXAMPLE 1

FIG. (1a) shows a substrate 1 of glass, quartz glass in the present example, carrying a layer of molybdenum 2 having a thickness of 6 $\mu$m. If desired, molybdenum can be replaced by, for example, titanium or silicon. According to the present example, the layer is provided by means of sputtering. If silicon is used, the layer may also be applied by, for example, chemical deposition from the vapour phase.

Figure 1A:
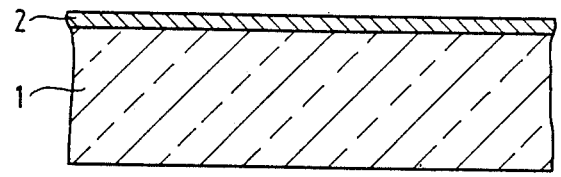
FIGS. 1a–i are schematic representations of a number of steps in the method according to the invention.
Figure 1B:
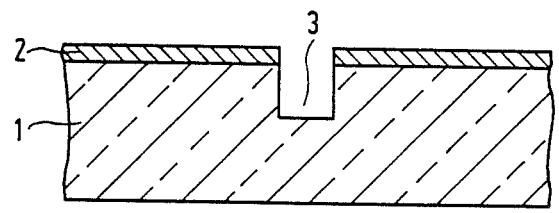

A photoresist pattern is formed using a customary UV sensitive photoresist material on the basis of novolak, and by means of UV contact exposure and local dissolution in a diluted solution of NaOH in water. Apertures are etched in the molybdenum layer according to a pattern by means of a mixture of phosphoric acid and nitric acid. Subsequently, a groove 3 is formed in the substrate 1 by means of reactive ion etching (anisotropic), said groove having a diameter of, for example, 6×6 μm, see FIG. 1b.

Figure 1C:
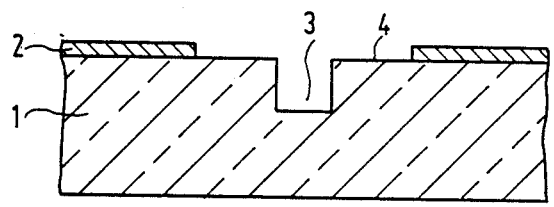

Subsequently, the molybdenum is removed along the edges of the grooves, again by means of a photoresist, exposure and local dissolution, see FIG. 1c, which step may be carried out with a relatively low accuracy as regards width and position, i.e. in comparison with the step in which the grooves are formed. The width of the molybdenum-free track 4 amounts to approximately 20 μm.

Figure 1D:
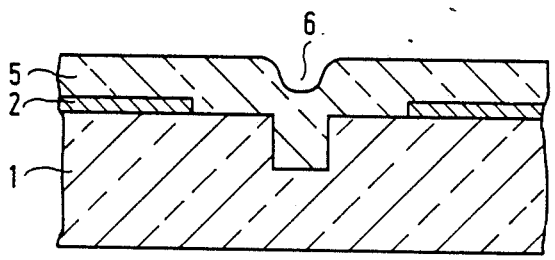

A layer of silicon dioxide 5 having a thickness of 7 μm is applied by means of high-frequnecy sputtering (frequency 13.6 MHz) in an argon atomosphere at pressure of 3 Pa, see FIG. 1d). The target plate consists of quartz glass. The material deposited obtains a higher refractive index than the substrate material due to the use of a relatively high argon pressure and by applying a bias voltage to the substrate, for example a voltage of 20% of the voltage between the target plate and the substrate plate. If desired, a high refractive index can also be obtained by using a target plate consisting of silicon dioxide with a germanium-dioxide doping. The groove 3 is filled completely. The surface of the layer 5 may have recesses 6 at the location of the groove, in particular at locations where grooves intersect or meet. The differences in height generally amount to less than 6 μm.

Figure 1E:
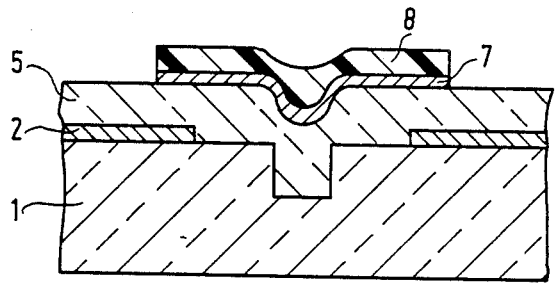
Figure 1F:
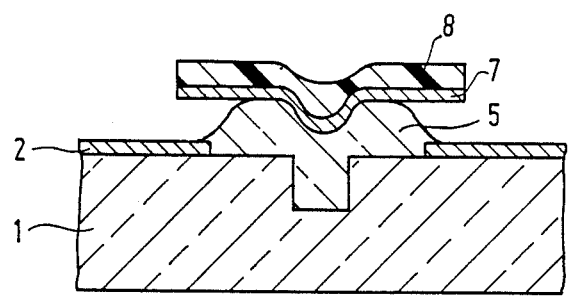

An adhesive layer 7 of molybdenum with a thickness of 35 nm is provided by means of sputtering. Said adhesive layer is coated with a protective layer 8 of a photoresist which is exposed according to a pattern and developed, after which the molybdenum released is removed. The glass layer 5 remains covered at the location of the grooves, see FIG. 1e), a relatively low positional accuracy being sufficient. The width if the protective layer 8 is larger than the corresponding aperture in the stop layer 2.

Figure 1G:
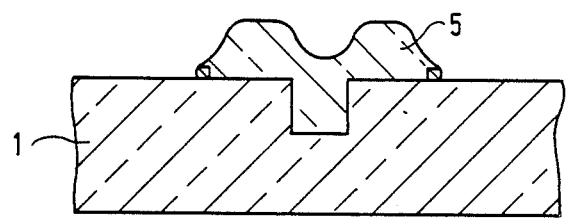

The unprotected parts of the glass layer 5 are dissolved by means of wet chemical etching in hydrofluoric acid (concentration 4% of HF, preferably in a buffer solution), the molybdenum layer 2 serving as a stop layer for the etching process, see 1(1f), for which reason the etching time is not critical. Subsequently, the residual photoresist and molybdenum are removed by dissolving them in acetone and a mixture of phosphoric acid and nitric acid, respectively, see FIG. 1g).

Figure 1H:
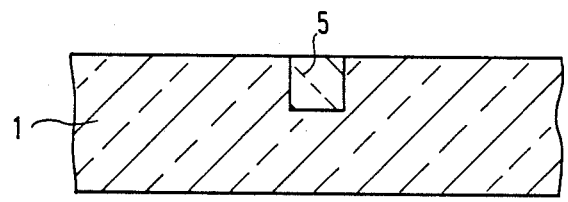

The intermediate product thus obtained is a flat substrate containing raised portions in a small part of its surface. These are removed by polishing using a suspension of SiO2 particles having dimensions of approximately 20 nm in a NaOH solution having a pH-value of approximately 10.5, see FIG. 1h). As soon as the raised portions have been removed, the effectiveness of the polishing operation decreases rapidly so that a flat surface is obtained, the decrease of the substrate thickness being considerably less than 1 μm.

Figure 1I:
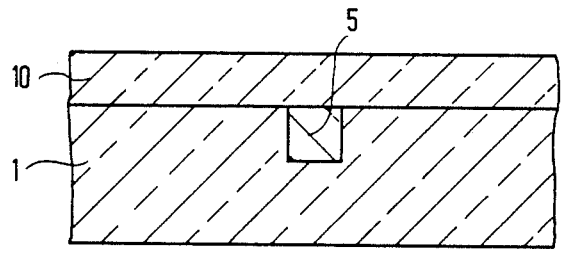

If desired, a protective layer 10 of quartz glass is provided, see FIG. 1i), for example, in a customary manner by means of chemical deposition from the vapour phase and using a plasma so that a high deposition rate can be obtained. The composition of the protective layer is selected so that the refractive index is smaller than that of the material used to fill up the grooves.

The material provided by chemical deposition is fused into a homogeneous layer at a temperature which is lower than the temperature at which the glass of the optical waveguide can deform, for example at 1100° to 1200° C. The latter step is superfluous if the protective layer is provided by means of chemical deposition from the vapour phase under the influence of a plasma.

EXAMPLE 2

The method is conducted in the same way as in the preceding example; the glass layer 5, however, being formed by means of chemical deposition from the vapour phase, to which end SiCl4, GeCl4 and oxygen and/or water vapour are introduced into a reactor. The particles deposited are fused into a glass layer at a temperature of from 1400° to 1500° C. Instead of germanium dioxide a nitrogen doping may alternatively be used ot ensure that the glass layer 5, which will form the core glass of the optical waveguide, obtains a higher refractive index than the substrate material and the coating material.

If desired, the adhesive layer 7 of molybdenum can be replaced by another adhesive layer, for example, of hexamethyldisilazane.

EXAMPLE 3

The method is conducted in the same way as in the first example; the substrate 1 consisting of a fluorine-doped layer of quartz glass having a thickness of 20 μm, which is provided on a quartz-glass carrier by means of chemical deposition from the vapour phase under the influence of a plasma. The glass layer 5 is formed by high-frequency sputtering using a target plate of quartz glass which may now have the same refractive index than the carrier (not shown in the drawing) to which the fluorine-doped substrate layer is applied.

Optical waveguides manufactured by the method according to the invention can suitably be used as single-mode light conductors. The choice of the groove pattern permits waveguides to be split or united in known manner so as to manufacture a planar optical component.

What is claimed is:

1. In a method of manufacturing a planar optical component, in which (1) a metallic mask is applied to a glass substrate and at least one groove is etched in the glass substrate, (2) the substrate is covered with a layer of glass having a refractive index which is higher than that of the substrate glass, the groove being filled entirely with the higher refractive index glass, and (3) etching to remove excess glass, the improvement wherein the metallic mask is not removed before providing the layer of the glass having the high refractive index, the metallic mask serving as a stop layer during the removal of excess glass by etching, and prior to said step (3) etching, the high refractive index glass which has been provided is protected against said step (3) etching at the location of the groove by covering the glass with a protective layer which is applied according to a pattern, and after said step (3) etching step the protective layer and mask are removed and then the higher refractive index glass at the location of the filled groove is removed down to the level of the substrate by polishing.

2. A method as claimed in claim 1, wherein the metallic mask is partly removed after the etching of the grooves, the substrate being cleared along the edges of the grooves.

3. A method as claimed in claim 1, wherein a protective layer of glass is applied after polishing.

4. A method as claimed in claim 1, wherein a layer of molybdenum is used as a metallic mask.

5. A method as claimed claim 1, wherein the glass having the high refractive index is formed by high-frequency sputtering of a silicon dioxide target plate in an argon atmosphere at a pressure of at least 1 Pa, the substrate being at a positive electric potential.

6. A method as claimed in claim 1, in which the substrate consists quartz glass, wherein the glass having the high refractive index is formed by means of chemical deposition from the vapour phase and using a nitrogen doping.

7. A method as claimed in claim 1, in which the substrate consists of quartz glass, wherein the glass having the high refractive index is formed by means of chemical deposition from the vapour phase and using a germanium dioxide doping.

8. A method as claimed in claim 1, in which the substrate consists of quartz glass, wherein the glass having the high refractive index is formed by sputtering using a target plate of silicon dioxide which is doped with germanium dioxide.

9. A method as claimed in claim 1, wherein the substrate consists of fluorine-doped quartz glass, and in that the glass having the high refractive index is formed by sputtering using a silicon dioxide target plate.

* * * * *